(12) United States Patent
Pinkerton et al.

(10) Patent No.: US 6,463,738 B1
(45) Date of Patent: Oct. 15, 2002

(54) METHOD AND APPARATUS FOR PROVIDING A CONTINUOUS SUPPLY OF ELECTRIC POWER

(75) Inventors: Joseph F. Pinkerton, Austin, TX (US); David B. Clifton, Leander, TX (US); Kenneth E. Nichols, Arvada, CO (US); Michael D. Forsha, Golden, CO (US); James E. Dillard, Denver, CO (US); William D. Batton, Arvada, CO (US)

(73) Assignee: Active Power, Inc., Austin, TX (US)

( * ) Notice: Subject to any disclaimer, the term of this patent is extended or adjusted under 35 U.S.C. 154(b) by 0 days.

(21) Appl. No.: 09/861,962

(22) Filed: May 21, 2001

(51) Int. Cl.[7] ............................................. F01K 13/02
(52) U.S. Cl. ................................... 60/646; 60/657
(58) Field of Search ................................ 60/646, 657

(56) References Cited

U.S. PATENT DOCUMENTS 4,110,987 A * 9/1978 Cahn et al. ................. 60/652
5,731,645 A * 3/1998 Clifton et al. ................ 310/74
6,192,687 B1 * 2/2001 Pinkerton et al. ............. 60/646
6,255,743 B1 * 7/2001 Pinkerton et al. ........ 290/40 C

* cited by examiner

Primary Examiner—Hoang Nguyen
(74) Attorney, Agent, or Firm—Fish & Neave; Robert W. Morris

(57) ABSTRACT

A continuous power system provides a continuous supply of power to a load in the event that primary power fails or is degraded. The continuous power system includes an electrical machine, a turbine and a flywheel coupled to a shaft. When utility power is present, the machine operates as a motor to drive the shaft. During outages, the electrical machine operates as a generator to provide power to the load. Kinetic energy stored in the flywheel drives the shaft during initial power interruptions. During further short-term interruptions, a thermal energy supply (or thermal storage device) is used to provide vaporized liquid to the turbine so that the turbine drives the shaft. If the power loss or failure is extended, the turbine is driven by vapor produced by an evaporator heated from an external fuel supply. Numerous methods and apparatus are also described for reducing system losses and improving overall performance.

47 Claims, 2 Drawing Sheets

METHOD AND APPARATUS FOR PROVIDING A CONTINUOUS SUPPLY OF ELECTRIC POWER

BACKGROUND OF THE INVENTION

This invention relates to continuous power systems. In particular, the present invention relates to continuous power systems that provide a continuous supply of electric power when a primary power supply fails, or when deterioration occurs in the power being supplied to the end user.

Continuous power systems are often used to insure that, in the event of a loss of power from a primary power supply, such as failure due to equipment malfunction, downed lines or other reasons, electric power continues to be supplied. This is particularly applicable in applications relating to, for example, telecommunication systems because such systems typically include facilities that may be in relatively isolated locations, such as a telecommunication repeater tower. Other applications of the present invention include hospital operating room equipment, computer systems, computerized manufacturing equipment, airplane radar guidance systems, etc. Continuous power systems typically are reliable systems that avoid equipment failures, costly downtime and equipment damage, as well as providing necessary power that otherwise would not be available.

Known continuous power systems may employ an uninterruptible power supply (UPS) to provide alternating current (AC) power to the end user or critical load. The AC power may be provided directly to the load, or it may be provided through known switching circuitry that also may be utilized to switch in back-up power when utility power fails.

For known continuous power systems, batteries or flywheels may be employed as energy storage subsystems to provide bridging energy while a fuel-burning engine is started. Such flywheel systems may include a flywheel connected to an electrical machine that can operate both as a motor and a generator. For example, U.S. Pat. No. 5,731,645 describes flywheel systems that provide backup power to the load in UPS systems. The electrical machine is powered by a DC buss to operate as a motor when acceptable power is received from the primary power supply. When power from the primary power supply fails (or is degraded), the electrical machine is rotated by the kinetic energy of the flywheel and operates as a generator to supply power to the DC buss.

Continuous power systems often use prime movers (e.g., fuel-burning engines) to drive backup generators during prolonged power outages. These prime movers, however, are often costly, complicated, and may require extensive ongoing maintenance. In addition, the engines themselves may fail to start, resulting in a loss of power to the critical load. Moreover, some localities limit the running time or the number of starts per year for backup generator engines, thereby limiting the ability to test and maintain such systems.

Other energy storage systems currently used to provide backup power are often expensive and complicated. For example, in typical battery energy storage systems, there is a risk that undetected battery damage or corrosion of battery terminals can result in a failure to deliver backup power when needed. Moreover, batteries have a limited shelf life, in addition to requiring expensive ventilation, drainage, air conditioning and frequent maintenance. Flywheel energy storage systems, while avoiding most of the disadvantages of batteries, can be expensive since they are often mechanically complex and can require complicated power electronics.

Some known systems provide long-term power by driving a shaft-mounted generator with a turbine. For example, U.S. Pat. No. 6,255,743 (application Ser. No. 09/318,728) describes an uninterruptible power supply system that includes a shaft-mounted generator and a turbine. These turbines may be open systems, where the turbine is driven by a fuel source that is regularly renewed, such as LP gas, methane, gasoline, diesel fuel. In such instances, the turbine exhaust is allowed to escape into the environment.

Other turbine systems, however, may be closed or partially-closed systems. In such systems, some or all of the turbine exhaust is recaptured by the system for later use. For instance, in a partially-closed system that is steam powered, the system may be configured to recapture the steam that is exhausted from the turbine. The system may then condense the steam (using a condenser or through natural cooling) into water prior to reheating, revaporizing and reusing the steam to drive the turbine.

An object of the present invention is to provide continuous power systems that are more reliable than conventional UPS systems.

Another object of the present invention is to provide continuous power systems that provide multiple sources of short-term backup energy.

A further object of the present invention is to provide continuous power systems in which a source of short-term backup energy is angular momentum.

A further object of the present invention is to provide continuous power systems in which a source of short-term backup energy is stored thermal energy.

A still further object of the present invention is to provide continuous power systems that include a closed-loop turbine system that operates at higher reliability than conventional systems.

SUMMARY OF THE INVENTION

The continuous power systems of the present invention provide backup power in the event of a loss of power or reduction in power quality from a primary power supply—an OUTAGE. An OUTAGE, as defined herein, includes both an interruption in power from a source (such as utility power), as well as a degradation in quality of the power delivered by the source. This includes both short-term—in terms of seconds or minutes, and long-term, or extended OUTAGES (e.g., lasting hours, days, or even weeks).

Continuous power systems constructed in accordance with the present invention include a flywheel energy storage device that provides short-term backup power, as well as a source of stored thermal energy in the form of heated working fluid and other material (which may be referred to herein as a "thermal storage device"). In addition, the continuous power systems of the present invention include a turbine that is driven by a closed-loop supply of working fluid to provide long-term backup power to the end user or critical load.

These continuous power systems may include an electrical machine that can operate as a motor or as a generator mounted to a shaft that also includes the flywheel energy storage device and the turbine. During STANDBY mode, power from the primary power supply drives the electrical machine as a motor, which rotates the shaft at a predetermined speed. The STANDBY speed of the shaft is selected so that the flywheel can store a given amount of kinetic energy as angular momentum that will be converted into electrical energy in the event of a loss or degradation of primary power. In addition, during STANDBY mode, an accumulator is provided with a supply of liquid that is heated to provide a second source of short-term backup power.

During SHORT-TERM OUTAGES, the flywheel drives the electrical machine as a generator to provide the necessary backup power. As the length of time of the OUTAGE continues and the stored kinetic energy is depleted, the flywheel slows down. Once a predetermined speed is reached, the continuous power system activates its second source of short-term backup power—the thermal source. The stored heated fluid in the accumulator is provided to a preheater/evaporator device that adds enthalpy to the fluid that is provided to the turbine. The fluid is evaporated in this process, and the vapor drives the turbine. The turbine then drives the shaft, thereby enabling the electrical machine to continue to operate as a generator that supplies backup energy to the end user or critical load.

If it appears that the OUTAGE is going to be EXTENDED, based on a predetermined factor such as, for example, a reduced level of stored thermal fluid in the accumulator, a gas-fired burner is started, and the system enters EXTENDED OUTAGE mode. In this mode, the working fluid used to power the turbine is cycled via a closed loop through the preheater/evaporator to the turbine. Exhaust vapor is recaptured, condensed and resupplied to the preheater/evaporator. Those familiar with the art will appreciate that this process is commonly known as the Rankine cycle. A further feature of the closed-loop aspect of the present invention is the use of the condensed working fluid as a lubricant for the bearings of the shaft-mounted components, such as the flywheel, turbine and electrical machine. This eliminates the need for rotating seals and allows the entire system to be hermetically sealed.

Further features of the invention, its nature and various advantages will be more apparent from the accompanying drawings and the following detailed description of the preferred embodiments.

BRIEF DESCRIPTION OF THE DRAWINGS

The above and other objects and advantages of the present invention will be apparent upon consideration of the following detailed description, taken in conjunction with accompanying drawings, in which like reference characters refer to like parts throughout, and in which.

DETAILED DESCRIPTION OF THE INVENTION

Figure 1:
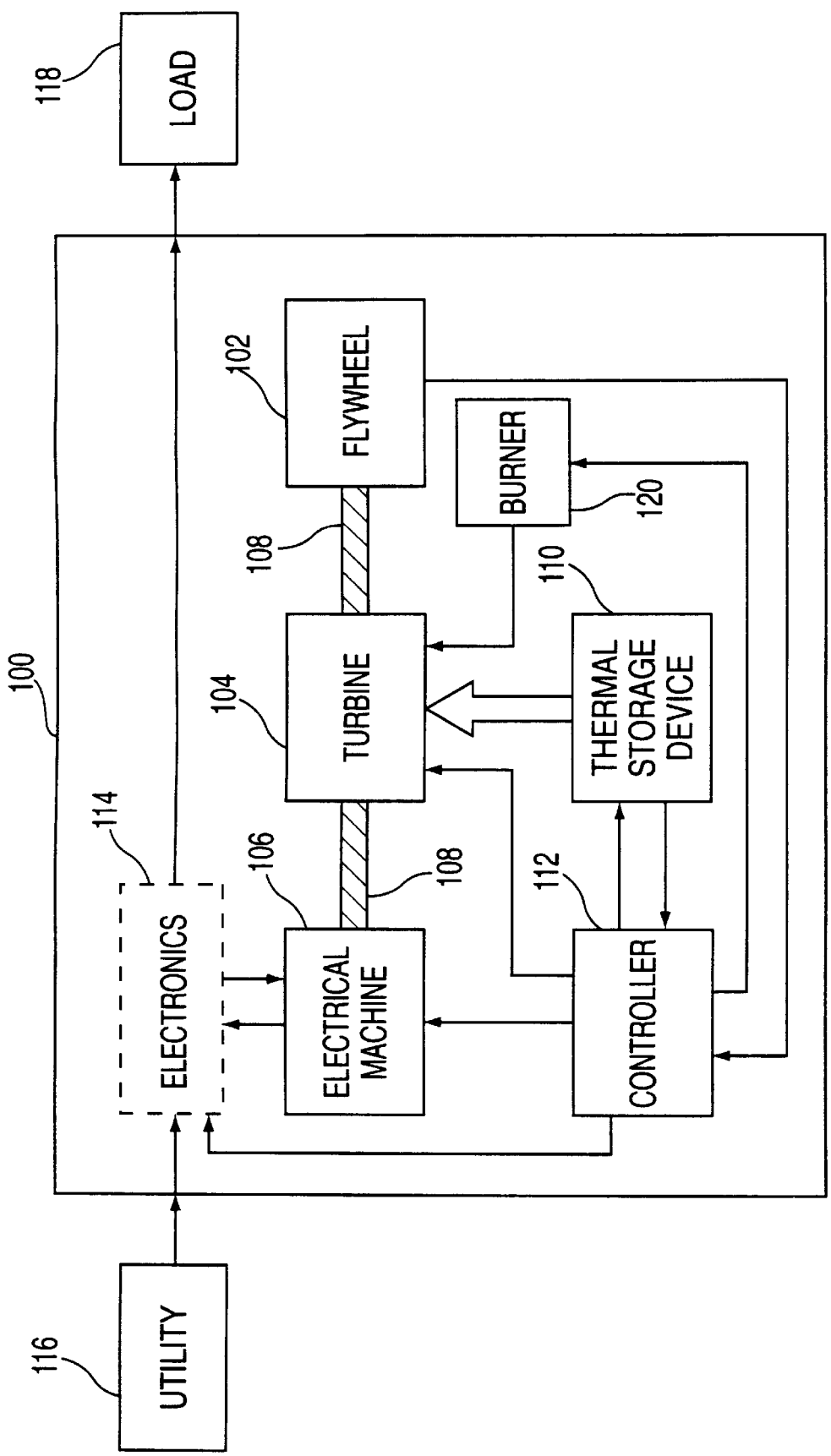
FIG. 1 is a schematic diagram of a continuous power system constructed in accordance with the present invention.

FIG. 1 shows a continuous power system 100 constructed in accordance with the present invention. Continuous power system 100 includes flywheel energy storage device 102, turbine 104 and electrical machine 106 that may be mounted to a common shaft 108. Alternately, flywheel 102, turbine 104 and electrical machine 106 may be mounted to individual shafts provided they are coupled together so that, depending on the operating condition of continuous power system 100, any of flywheel 102, turbine 104 or electrical machine 106 may provide the driving force to cause the other components to rotate about their shaft.

In addition, continuous power system 100 also includes thermal storage device 110, controller 112 and electronics 114, which is shown with a dashed line to indicate that various configurations of electronics may be used with UPS 100 without departing from the present invention. For example, during STANDBY operation, utility supply 116 may supply electricity directly through electronics 114 to load 118. Alternately, as is well known, electronics 114 may perform a double conversion, so that continuous power system 100 always provides power to load 118 (in which case, power from utility supply 116 is converted from AC to DC and back to AC before being supplied to load 118).

Electrical machine 106 may be a combined motor/generator, or it may be formed from separate motor and generator components mounted to a single or separate, but coupled, shafts. During STANDBY operations, electric power from utility 116 powers machine 106 as a motor. During any OUTAGE operation, other components provide the energy to drive shaft 108 and machine 106 is operated as a generator to provide the necessary backup power to load 118.

Energy storage device 110 is a container that stores a liquid working fluid (as described more fully below) for use with turbine 104. The container for device 110 should be a material with desirable thermal and mechanical properties such as steel or other metal, so that thermal energy used to heat the liquid working fluid may also be stored as sensible heat in the container itself. The liquid working fluid, and the container itself, may be heated, for example, by an electrically powered resistor immersed in the liquid working fluid. As the liquid working fluid is heated by the resistor, thermal energy passes from the liquid working fluid to the container, and then may also be passed to other components of the continuous power system as described more fully below.

In general, continuous power system 100 operates in accordance with the principles of the present invention as follows. Assuming that power from utility 116 is available and that electronics 114 is configured such that utility power may be supplied directly to load 118, load 118 is powered by utility 116 during STANDBY operations. In addition, utility power is provided to electrical machine 106, which operates as a motor to drive shaft 108 at a predetermined speed, thereby storing kinetic energy in flywheel 102.

At the same time, liquid working fluid in thermal storage device 110 is heated, for example, by electricity passing through a resistor, to a predetermined temperature and stored for use during OUTAGE conditions. Moreover, as described above, the container storing the heated liquid working fluid is also maintained at a high temperature, so that the sensible heat in the container is added to the stored thermal energy of storage device 110. Controller 112 (and/or other circuitry) monitors various parameters to determine whether utility 116 is providing power within certain guidelines (this may be as simple as the presence of power, or it may include determining the quality of the power being provided by utility 116).

Once controller 112 has determined that an OUTAGE has occurred, continuous power system 100 enters INITIAL OUTAGE mode, and electrical machine 106 ceases to operate as a motor. During INITIAL OUTAGE mode, shaft 108 is driven by the kinetic energy stored in flywheel 102, and electrical machine 106 is operated as a generator that provides power to load 118 through switching electronics 114. If the OUTAGE ends prior to the rotational speed of flywheel 102 falling below a predetermined level, utility power is again supplied to machine 106 which switches back to operating in MOTOR mode. After some time has passed, shaft 106 is again rotating at STANDBY speed and continuous power has been provided to load 118 through the entire OUTAGE.

If, on the other hand, the rotational velocity of flywheel 102 falls below a certain threshold, continuous power system 100 enters SHORT-TERM OUTAGE mode and thermal storage device 110 is utilized to drive shaft 108 so that electrical machine 106 continues to provide power to load 118. Thermal storage device 110 includes a heated liquid (which is heated by, for example, a resistive heating element—see FIG. 2) that, upon receiving an activation signal from controller 112 (which may simply be a signal that opens a valve), is provided to a preheater/evaporator device as described more fully below.

The preheater/evaporator helps convert the liquid to vapor and add enthalpy to the vapor (because the tubing that comprises the preheater/evaporator also stores sensible thermal energy that radiates and conducts from thermal energy storage device 110). It should be noted that, even without the preheater/evaporator, the stored liquid working fluid, if superheated, would turn into vapor once released from energy storage device 110, which would be pressurized, due to expansion. The vapor is then delivered to turbine 104, which causes turbine 104 to rotate.

Rotating turbine 104 in turn drives shaft 108 and, accordingly, machine 106 (which is driven in GENERATOR mode), to continue to provide uninterrupted power to load 118. This portion of temporary backup power is based on thermal storage device 110, the second source of stored backup energy in continuous power system 100, rather than the flywheel previously described.

Controller 112 monitors, for example, the fluid level in thermal storage device 110 during SHORT-TERM OUTAGE mode. When that liquid working fluid falls to a predetermined level (or when a predetermined amount of time passes after SHORT-TERM OUTAGE mode has been triggered), continuous power system 100 begins preparations to enter the next mode by lighting burner 120, which heats the preheater/evaporator device. When controller 112 determines that the loss of stored thermal energy is imminent (such as by determining that a predetermined amount of fluid is remaining), LONG-TERM OUTAGE mode is triggered. At this point in time, all or almost all of the energy stored in the two different backup devices is depleted, the OUTAGE has not ended, and burner 120 has heated the preheater/evaporator at least to a given temperature.

During LONG-TERM OUTAGE mode, shaft 108 is driven by turbine 104, which continues to receive vapor from the heated preheater/evaporator. The working liquid may be, in accordance with the present invention, in a closed loop system such that the exhaust vapor is condensed back to liquid and collected in a reservoir or tank, as described in detail below, for recycling to the preheater/evaporator. Electrical machine 106 continues to operate in GENERATOR mode so that continuous power system 100 continues to provide power to load 118 throughout the entire OUTAGE. Controller 112 continues to monitor the availability and quality of power from utility 116 so that, when the OUTAGE ends, continuous power system 100 can be switched from LONG-TERM OUTAGE mode to STANDBY mode.

During the transition from LONG-TERM OUTAGE to STANDBY mode, while power is again being provided from utility 116 to electrical machine 106 (so that it may return to MOTOR mode), liquid working fluid is returned to thermal storage device 110 and reheated to its standby, superheated temperature. At that point, because flywheel 102 is already rotating at or near its standby speed from turbine 104, both of the sources of backup power in continuous power system 100 are fully recharged and ready to perform in the event of another OUTAGE. The return and reheating of liquid working fluid to thermal storage device 110 may also be fully or partially accomplished during LONG-TERM OUTAGE mode.

Figure 2:
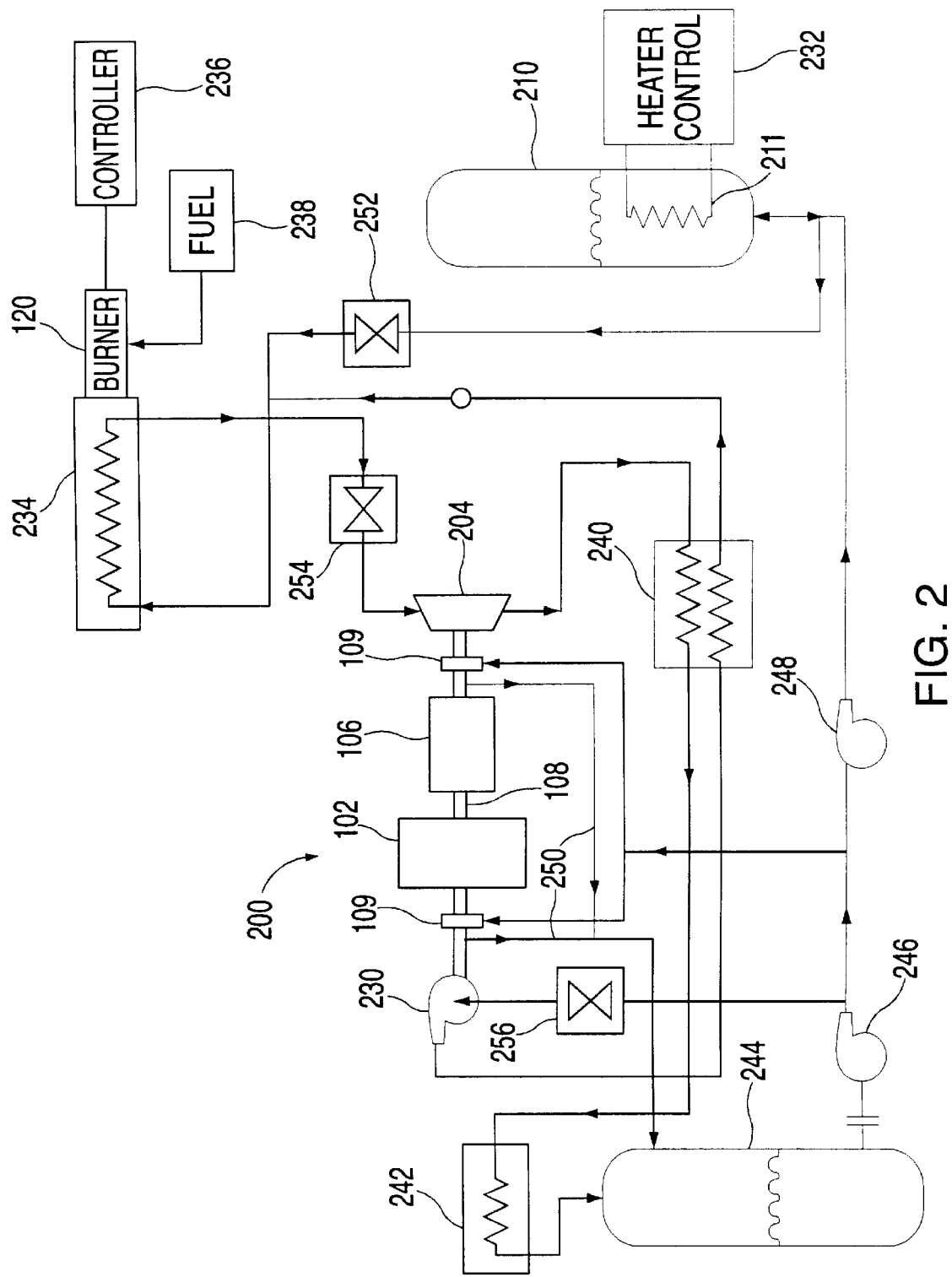
FIG. 2 is a schematic diagram of the working fluid delivery system of a closed engine turbine continuous power system constructed in accordance with the principles of the present invention.

FIG. 2 is a schematic diagram showing a closed engine (or closed loop) continuous power system 200 constructed in accordance with the principles of the present invention. Continuous power system 200 may, in fact, be the same continuous power system as continuous power system 100 of FIG. 1, thereby showing a particular embodiment of a closed engine continuous power system (continuous power system 100, however, need not be a closed loop system). For clarity, the controller and its connections to the flywheel, turbine, electrical machine, thermal storage device and switching electronics have been omitted (as well as connections to the control valves and pumps shown in FIG. 2). While various working fluids are known to be used with turbines, it may be preferable to utilize toluene, refrigerants, water, or other substances with advantageous thermal and fluid properties, as the working fluid.

As shown in FIG. 2, closed engine continuous power system 200 includes flywheel 102, turbine 204 (numbered 204 to show that it may be different than turbine 104 of FIG. 1, but need not be) and electrical machine 106 mounted to shaft 108. Feed pump 230 may also be mounted to shaft 108. Shaft 108 is itself mounted so that it may rotate within bearings 109. The thermal storage device in continuous power system 200 is accumulator 210, which is a vessel or container that includes a heater 211 mounted therein for heating the liquid working fluid to its standby temperature. Heater 211 is controlled by controller 232, which is powered by utility 116.

As briefly described above, continuous power system 200 also includes preheater/evaporator 234, which may be heated during LONG-TERM OUTAGES. Under those circumstances, preheater/evaporator 234 is heated by gases that have been heated by burner 120, which burns fuel from fuel supply 238. Burner 120 may be controlled by burner controller 236 (as shown), or it may controlled by a central controller that controls continuous power system 200.

Continuous power system 200 also may include recuperator 240 to transfer heat from the vapor exhausted by turbine 204 to the working fluid entering preheater/evaporator 234. Moreover, as described above, the exhausted vapor is eventually passed through condenser 242 which converts the vapor back to a liquid. The liquid is then collected in liquid tank 244 (commonly known as a hot well).

The collected liquid is fed from tank 244 back into the system by boost pump 246, although the final destination of the liquid supplied by boost pump 246 depends-on the current mode of operation. For example, if continuous power system 200 is in STANDBY mode, boost pump 246 supplies liquid to accumulator 210 through charge pump 248 until a predetermined level is reached. Under other circumstances, boost pump 246 provides liquid to feed pump 230, which pressurizes it and provides it to preheater/evaporator 234.

In another aspect of the present invention, boost pump 246, in all modes of operation, provides the working fluid in liquid form to bearings 109 for lubrication. Lubricating liquid is returned to tank 244, as shown by return lines 250, for reintroduction into continuous power system 200.

The operation of closed engine continuous power system 200 may include the same four modes as previously described, namely, STANDBY, INITIAL OUTAGE, SHORT-TERM OUTAGE and LONG-TERM OUTAGE. During STANDBY mode, flywheel 102 is rotated within a predetermined range of velocity and accumulator 210 is full of fluid heated by heater 211 within a predetermined temperature range. Switch valves 252, 254 and 256, respectively located between: accumulator 210 and preheater/evaporator 234; turbine 204 and preheater/evaporator 234; and feed pump 230 and boost pump 246; are CLOSED. Power from utility 116 is provided to machine 106 (which operates as a motor), heater control 232, burner controller 236 and load 118. Boost pump 246 provides pressurized liquid working fluid to bearing 109 to properly lubricate the bearings.

Once an interruption in power from utility 116 has been determined (which may include a complete disruption or a degradation in power quality), continuous power system 200 enters INITIAL OUTAGE mode, at which point flywheel 102 becomes the driver of shaft 108. Due to the OUTAGE, power is no longer supplied to machine 106, which begins to operate as a generator instead of as a motor. The generator provides power to load 118, burner controller 236 and pump 246. At this point in time, valves 252, 254 and 256 remain CLOSED. During INITIAL OUTAGE mode, the controller monitors the rotational velocity of flywheel 102 until it falls below a predetermined level.

Once flywheel 102 has slowed down to the predetermined level, SHORT-TERM OUTAGE mode is triggered. In this mode, the second supply of stored energy in continuous power system 200 is utilized to provide backup power to load 118. Valves 252 and 254 are opened, while valve 256 remains CLOSED.

The superheated vapor passing through valve 254 is injected into turbine 204, which causes turbine 204 to apply torque to shaft 108. Rotating turbine 204 drives shaft 108, which enables machine 106 (operating in GENERATOR mode) to continue generating electricity that is provided to load 118 and all operating valves, pumps and controllers of system 200. The system controller monitors the level of liquid in accumulator 210 to determine when to begin transitioning to the next mode.

Once the liquid in accumulator 210 falls below a first predetermined level (or, if a different triggering event is used, such as when a predetermined amount of time has passed since SHORT-TERM OUTAGE mode was triggered), burner controller 236 ignites burner 120, which begins burning fuel from supply 238 and heating preheater/evaporator 234. After the liquid in accumulator 210 falls below a second predetermined level, LONG-TERM OUTAGE mode is triggered and valve 252 is closed, while valve 256 is opened. Once valve 256 is OPEN, liquid working fluid from tank 244 is pumped by pumps 246 and 230 through recuperator 240 and into preheater/evaporator 234.

Once the liquid is vaporized and superheated, vapor is injected into turbine 204 causing it to continue driving shaft 108. In this state, valve 252 remains CLOSED, pump 248 remains OFF, and valves 254 and 256 remain OPEN. The working fluid continues to be cycled in a closed loop from the tank, into the preheater/evaporator, through the turbine, condenser and back into the tank.

In accordance with another aspect of the present invention, recuperator 240 provides additional thermal efficiency during this mode by exchanging the heat from the vapor being exhausted by turbine 204 to the liquid being provided to preheater/evaporator 234. During LONG-TERM OUTAGE mode, excess power may be used to refill accumulator 210 and reheat it.

After the OUTAGE ends, continuous power system 200 begins the transition back to STANDBY mode. Flywheel 102 is already spinning at least somewhat close to its standby speed (from being on shaft 108, which is being driven by turbine 204). Valves 254 and 256 are CLOSED and charge pump 248 is turned ON, causing liquid working fluid to be provided to accumulator 210. The filling of accumulator 210 continues until the level of liquid in accumulator 210 reaches a predetermined level, at which point charge pump 248 is turned OFF. Power from utility 116 is also provided to heater controller 232 and heater 211, which heats the liquid working fluid in accumulator 210 to its STANDBY temperature. Burner 120 is eventually turned OFF.

From the foregoing description, persons skilled in the art will recognize that this invention provides effective, uncomplicated, battery-free, low maintenance, and relatively inexpensive ways of providing an uninterrupted and continuous supply of electrical power to a critical load. It will also be recognized that the invention may take many forms other than those disclosed in this specification.

Accordingly, it is emphasized that the invention is not limited to the disclosed methods and apparatuses, but is intended to include variations to and modifications thereof which are within the spirit of the following claims.

We claim:

1. A continuous power system that receives primary power from a primary power supply and provides power to a load, said continuous power system being operable in modes comprising STANDBY, INITIAL OUTAGE, SHORT-TERM OUTAGE and LONG-TERM OUTAGE modes, said continuous power system comprising:

a rotary electrical machine having a machine rotor mounted to a shaft, said electrical machine being electrically connectable to said primary power supply and being operable as a motor during STANDBY mode when it receives electric power from said primary power supply, and operable as a generator to supply power to said load during all other modes;

a flywheel that stores kinetic energy, coupled to said shaft, said flywheel driving said shaft during INITIAL OUTAGE mode;

a thermal storage device that stores thermal energy which is used to convert a liquid working fluid to vapor during SHORT-TERM OUTAGE mode;

an external source of heat; and a turbine having a turbine rotor coupled to said shaft, said turbine being driven by thermal storage device vapor during SHORT-TERM OUTAGE mode, and being driven by working fluid evaporated by said external source of heat during LONG-TERM OUTAGE mode, said turbine driving said shaft in both SHORT and LONG TERM OUTAGE modes.

2. The continuous power system of claim 1, wherein said thermal storage device comprises:

a container that stores said liquid working fluid; and a heater that heats said liquid working fluid.

3. The continuous power system of claim 2, wherein said container comprises a material that stores thermal energy.

4. The continuous power system of claim 1, further comprising:

a controller that activates said thermal storage device when said flywheel slows down below a predetermined threshold during INITIAL OUTAGE mode.

5. The continuous power system of claim 1, further comprising:

a controller that couples an output of said electrical machine to said load if power from said primary power supply fails to meet predetermined specifications.

6. The continuous power system of claim 5, wherein said output of said electrical machine provides a DC output.

7. The continuous power system of claim 1, wherein said liquid working fluid is toluene.

8. The continuous power system of claim 1 further comprising:

a closed loop system coupled to said turbine that holds substantially all of said liquid working fluid and vapor utilized to drive said turbine.

9. The continuous power system of claim 1, wherein said thermal storage device comprises:

an accumulator that stores said liquid working fluid; and an accumulator heater that heats said stored liquid working fluid.

10. The continuous power system of claim 9, wherein said accumulator comprises a material that also stores thermal energy.

11. The continuous power system of claim 9 further comprising:

a preheater/evaporator that adds enthalpy to vapor that is injected into said turbine.

12. The continuous power system of claim 11, wherein said preheater/evaporator comprises a material that also stores thermal energy.

13. The continuous power system of claim 11, wherein said liquid working fluid is supplied to said preheater/evaporator from said accumulator during SHORT-TERM OUTAGE mode.

14. The continuous power system of claim 11, wherein said preheater/evaporator receives at least a portion of said liquid working fluid from condensed turbine exhaust vapor during LONG-TERM OUTAGE mode.

15. The continuous power system of claim 14 further comprising:
   a recuperator coupled to receive hot exhaust vapor from said turbine, said recuperator operating to transfer heat from said hot exhaust vapor to said liquid working fluid during LONG-TERM OUTAGE mode.

16. The continuous power system of claim 11, wherein said external source of heat comprises:
   an external burner that heats said preheater/evaporator during LONG-TERM OUTAGE mode.

17. The continuous power system of claim 1 further comprising:
   a condenser that converts exhaust vapor from said turbine into liquid working fluid; and
   a tank that collects said liquid working fluid.

18. The continuous power system of claim 17 further comprising:
   a preheater/evaporator that converts said liquid working fluid to vapor that drives said turbine; and
   a closed loop pump system coupled to said turbine that provides said liquid working fluid to said preheater/evaporator during LONG-TERM OUTAGE mode.

19. The continuous power system of claim 1 further comprising:
   a condenser that converts vapor exhausted from said turbine into liquid working fluid; and
   a plurality of bearings that said shaft rotates within, said bearings being lubricated by a portion of said liquid working fluid.

20. The continuous power system of claim 1 further comprising:
   electronics that passes power from said primary power supply to said load during STANDBY mode, and passes power from said electrical machine to said load during all other modes.

21. The continuous power system of claim 20, wherein power from said electrical machine is DC.

22. A continuous power system that receives power from a primary power supply and supplies power to a load, said continuous power system comprising:
   an electrical machine having a machine rotor and the capability to operate in GENERATOR and MOTOR modes, said machine operating in MOTOR mode when supplied with electric power from said primary power supply, said machine being mounted to a shaft;
   a flywheel drivingly coupled to said shaft, said flywheel driving said shaft upon an initial OUTAGE of power from said primary power supply;
   an accumulator that stores superheated liquid working fluid; and
   a turbine drivingly connected to said shaft and being coupled to receive liquid working fluid that has been converted to superheated vapor, said turbine being driven by said superheated vapor that is injected into said turbine when said flywheel slows down below a predetermined threshold, said injected vapor driving said turbine to drive said shaft to supply electric power to said load.

23. The continuous power system of claim 22 further comprising:
   a preheater/evaporator coupled between said accumulator and said turbine, said preheater/evaporator being operable to convert said liquid working fluid to said superheated vapor.

24. The continuous power system of claim 22, wherein said accumulator comprises:
   a thermally conductive housing that stores thermal energy.

25. The continuous power system of claim 22 further comprising:
   a condenser that converts hot exhaust vapor from said turbine into condensed liquid working fluid;
   a tank that collects said condensed liquid working fluid; and
   a pump system that provides said condensed liquid working fluid to said preheater/evaporator after a substantial portion of said stored superheated liquid working fluid is expended.

26. The continuous power system of claim 25 further comprising:
   a recuperator that exchanges heat from said hot exhaust vapor to said condensed liquid working fluid.

27. The continuous power system of claim 22 further comprising:
   a plurality of bearings that said shaft rotates within, said bearings being lubricated by working fluid.

28. A continuous power system that receives power from a primary power supply and supplies power to a load, said continuous power system comprising:
   an electrical machine mounted to a shaft, said electrical machine operating as a motor when supplied with power from said primary power supply and otherwise operating as a generator;
   a flywheel drivingly coupled to said shaft, said flywheel driving said shaft during initial OUTAGES of said primary power supply;
   an accumulator that stores superheated liquid working fluid;
   a preheater/evaporator coupled at least to said accumulator; and
   a turbine drivingly connected to said shaft and being coupled to said preheater/evaporator, said turbine being driven by said liquid working fluid from said accumulator that is converted into superheated vapor by expansion and injected into said turbine when said flywheel slows down below a predetermined threshold, said driven turbine driving said shaft so that said machine generates electric power that is supplied to said load.

29. The continuous power system of claim 28, wherein said accumulator comprises:
   a housing that stores thermal energy.

30. The continuous power system of claim 28 further comprising:
   a condenser coupled to receive exhaust vapor from said turbine, said condenser being operable to convert said exhausted vapor into condensed liquid working fluid;
   a tank that collects said condensed liquid working fluid; and
   a closed-loop re-circulation system that provides said collected liquid working fluid to said preheater/evaporator for conversion to vapor.

31. The continuous power system of claim 30 further comprising:
   a burner that provides heat to said preheater/evaporator based on an external supply of combustible material, said burner being ignited when a predetermined threshold is reached.

32. The continuous power system of claim 31, wherein said predetermined threshold comprises a predetermined reduced level of liquid working fluid in said accumulator.

33. The continuous power system of claim 31, wherein said predetermined threshold comprises a given period of time after said accumulator begins providing liquid working fluid to said preheater/evaporator.

34. The continuous power system of claim 28 further comprising:
   a plurality of bearings mounted about said shaft, said bearings being lubricated by liquid working fluid.

35. The continuous power system of claim 30 further comprising:
   a recuperator coupled to receive said vapor exhausted from said turbine, and to receive said collected liquid working fluid, said recuperator being operable to transfer heat from said vapor to said liquid working fluid prior to said liquid working fluid being provided to said preheater/evaporator.

36. A method of providing backup power to a load comprising:
   supplying power, during STANDBY mode, from a primary power supply to an electrical machine that operates as a motor and causes kinetic energy to be stored in a flywheel as rotational momentum;
   driving said electrical machine as a generator from said stored kinetic energy upon an initial OUTAGE of power from said primary power supply;
   converting liquid working fluid stored in a thermal storage device into superheated vapor when said rotational momentum of said flywheel falls below a threshold level; and
   using a turbine to drive said electrical machine as a generator by injecting said superheated vapor into said turbine.

37. The method of claim 36 further comprising:
   capturing vapor exhausted by said turbine;
   condensing said captured vapor into liquid working fluid; and
   recycling said condensed liquid to said preheater/evaporator during LONG-TERM OUTAGE mode.

38. The method of claim 37, wherein said LONG-TERM OUTAGE mode is triggered when a predetermined reduced level of said stored liquid working fluid is detected in said accumulator.

39. The method of claim 37, wherein said said LONG-TERM OUTAGE mode is triggered when a given period of time has passed after said rotational momentum of said flywheel falls below a threshold level.

40. The method of claim 36 further comprising:
   lubricating a plurality of bearings mounted to a shaft with liquid working fluid, said electrical machine, said flywheel and said turbine being mounted to said shaft.

41. A method of providing backup power to a load comprising:
   supplying power from a primary power supply to an electrical machine operating as a motor, said motor driving a shaft;
   storing kinetic energy in a flywheel coupled to said shaft as rotational momentum;
   driving said shaft with said stored kinetic energy during an initial interruption of power from said primary power supply such that said electrical machine operates as a generator and provides backup power to said load;
   converting liquid working fluid stored in a thermal storage device into superheated vapor when said rotational momentum of said flywheel falls below a threshold level; and
   using a turbine to drive said electrical machine as a generator by injecting said superheated vapor into said turbine.

42. The method of claim 41, wherein said converting comprises:
   transferring said liquid working fluid from a pressurized container to a non-pressurized tube.

43. The method of claim 41, wherein said converting comprises:
   transferring said liquid working fluid from said thermal storage device to a preheater/evaporator so that said liquid working fluid expands.

44. The method of claim 41 further comprising:
   capturing vapor exhausted by said turbine;
   condensing said captured vapor into liquid working fluid; and
   recycling said condensed liquid to said preheater/evaporator during LONG-TERM OUTAGE mode.

45. The method of claim 44, wherein said LONG-TERM OUTAGE mode is triggered when said stored liquid working fluid falls below a predetermined reduced level.

46. The method of claim 44, wherein said LONG-TERM OUTAGE mode is triggered when a given period of time has passed after said rotational momentum of said flywheel falls below a threshold level.

47. The method of claim 41 further comprising:
   lubricating a plurality of bearings mounted to a shaft with liquid working fluid, said electrical machine and said flywheel being mounted to said shaft.

* * * * *

UNITED STATES PATENT AND TRADEMARK OFFICE
CERTIFICATE OF CORRECTION

PATENT NO. : 6,463,738 B1  Page 1 of 1
DATED : October 15, 2002
INVENTOR(S) : Joseph F. Pinkerton et al.

It is certified that error appears in the above-identified patent and that said Letters Patent is hereby corrected as shown below:

Column 6,
Line 25, change "may controlled" to -- may be controlled --;
Line 36, change "depends-on" to -- depends on --;

Column 11,
Line 53, change "said said" to -- said --.

Signed and Sealed this

Tenth Day of June, 2003

JAMES E. ROGAN
*Director of the United States Patent and Trademark Office*